Patented Sept. 4, 1945

2,383,963

UNITED STATES PATENT OFFICE 2,383,963

METHODS OF TREATING FURS

Steven S. Gottfried, New York, N. Y.; Eva E. Gottfried, administratrix of said Steven S. Gottfried, deceased, assignor to Bureau for Financial Advice, Inc., New York, N. Y., a corporation of New York No Drawing. Application September 19, 1941, Serial No. 411,594

1 Claim. (Cl. 8—94.14)

This invention refers to improvements in or relating to processes of treating filaments, particularly animal filamentous materials, such as fur, hair or wool of animal skins or pelts and further relates to improved products derived from such processes.

Heretofore known processes for obtaining highly waterproof hairs or wool of skins with silk-like finish, particularly those of lambskins, made use of relatively highly concentrated solutions containing about 20% to 40% of formaldehyde. Such treatments required particular protection of the skin proper in order to avoid any attack thereof by formaldehyde which would cause brittleness of the skins and would harden top hairs to such extent that during mechanical treatment of the hairs under heat and pressure the hairs would break off.

A further disadvantage of the treatment according to known methods results from the application of highly concentrated formaldehyde solutions insofar that care has to be taken regarding health and working conditions of the workmen since working in an atmosphere produced by formaldehyde solution under heat is dangerous and has detrimental effects on the health of the workmen.

A still further disadvantage inherent in the known processes is the fact that the use of solutions of formaldehyde in highly concentrated form is not economical as regards the formaldehyde material which is expensive nowadays and very difficult to obtain.

The present invention avoids these and other disadvantages by providing a method for improving filamentous material, particularly fur, hair or wool of animal skins in a very economical way whereby refined fur products are obtained.

A further object of this invention is to provide a method for first preparing said skin or fur material to activate the same and to make it water repellent, or to impart to said material hydrophobic properties by introducing into the opened pores of individual hairs under treatment a substance, such as chlorine in nascent state so that the after-treatment or resinification may be brought about with relatively less concentrated means e. g. formaldehyde, than it has been theretofore used in known methods.

Still another object of the present invention is to produce furs or skins, the filamentous structure of which is refined by a prior bleaching and cleaning process step, after which said structure is treated to impart to it further desirable characteristics and properties for the purposes intended.

A still further object of the present invention is to provide improved products derived from the processes herein contemplated, said products undergoing no shrinkage, being resistant to attacks by insects, such as moths, and preserving their silky or silk-like gloss and softness during wear and storage.

Yet, another object of the present invention is to provide improved methods according to which the grain of the skin or pelt and particularly long hair lamb skins or portions thereof may be safely treated without rendering them brittle or without subjecting them to a drying up condition in or during any stage of the process, in which condition the skin would crack and the hairs would break off.

The above and other objects and advantages may be best understood from the following disclosure which sets forth how the invention may be carried out and the products obtained as a result of the knowledge gained through or derived from an understanding of the invention and it is further intended that there be included as part of the invention all such obvious changes and modifications thereof as would occur to a person skilled in the art to which this invention pertains and as would fall within the scope of the claim.

The process according to the present invention proposes a suitable pre-treatment which results in obtaining refined fur products treated with relatively weak or dilute solutions of formaldehyde, appearance and other desirable effects of such products being heretofore attained only with highly concentrated formaldehyde solutions.

Neither catalyzers nor other known agents, which were heretofore used to influence or accelerate the action resulting from the treatment of highly concentrated formaldehyde under mechanical pressure and heat, were capable of bringing about waterproofness of a degree and character imparted to the resultant product as may be produced by means of the above-mentioned pre-treatment.

The purpose of the said pre-treatment of the animal filaments of skins or furs is after the pores of the filamentous materials have been opened to bring about a good penetration of the substance or substances with which the material will be subsequently treated. Particularly chlorine and other halogens such as bromine, have been found as being very effective when used in connection with such pre-treatment.

An important advantage of the process according to this invention is that the after-treatment of such pretreated filamentous material enhances the waterproofness or hydrophobic quality of the final product which, when treated with a solution of formaldehyde of heretofore unknown relatively weak concentration shows surprisingly very good quality and improved appearance.

Consequently, the pre-treatment of the furs including a treatment with halogens and the after-treatment with means producing waterproofness, such as formaldehyde, results in obtaining an improved fur product which could heretofore only be attained by the use of highly concentrated formaldehyde or metal salt solutions having the effect of producing resistance to water and moisture. Such highly concentrated solutions, for example, of metal salts, are undesired for the reason that they cause an unnecessary accumulation and load on the filamentous material which is injurious to the quality of the resultant product.

In view of the proposed pre-treatment, the present invention makes it possible that means producing waterproofness and heretofore used in the textile industry may be made available for the fur industry, which means may now be utilized in combination with furs pre-treated with halogens, such as chlorine. Such waterproofness producing means are beside formaldehyde, latex, metallic salts, such as aluminum or copper sulphate etc. cellulose acetate dissolved in acetone and treated by alkalies, such as caustic soda.

The introduction of the necessary quantity of formaldehyde into and/or between the hairs of the furs can be effected, for example, by applying solutions, e. g. weak or dilute solutions, yielding only a concentration of about .7% or less of formaldehyde on or in the hairs, the furs thus treated remaining in such condition for one or more hours, the water at least partly being removed from the hairs, repeating this operation several times, and finally ironing or hot pressing the hairs. The ironing action depends on the temperature of the ironing tool and on the time during which the hot tool is contacted with the fur.

The ironing action should be at least sufficiently intense to ensure that after ironing the gloss of the hairs of the fur should be increased, that the hairs should be stretched and lie parallel to each other, and that if they become ruffled it should be possible to bring them into parallel position again by simple combing or gentle brushing; on the other hand, if the ironing action is too intense, the hairs of the fur will "shrink," viz.: the top of the hairs will become more or less kinky and will lose their parallel position, so that such a fur will present a dull appearance resembling that of raw furs and will not make the impression of an improved fur. Accordingly, these two facts will confine the extent of the ironing action between narrow limits, so that by simply inspecting the ironed goods it is possible to decide whether the ironing action was insufficient, correct or too intense.

It is to be noted, that, if the hairs or wool are treated in the pre-treatment stage with chlorine, the chlorination should leave an active concentration for example of about 1% to 2% or more of chlorine in the hairs. If such pre-treated hairs are then subjected to. after-treatment with formaldehyde, it is to be taken in consideration that not more than .7% concentration of formaldehyde should remain or be present in and/or on the filamentous material. In order to ascertain such formaldehyde value of the material the Romijn or Romijn-Jean method may be employed by means of which the quantity of formaldehyde in the hairs may be calculated. According to said method air-dry hairs of any fur are exhaustively distilled with a solution of 15% hydrochloric acid the weight of which amounts to hundred times the weight of the hairs, while the water evaporated is continuously replaced and the distillate is titrated by means of iodine solution. From the quantity of iodine consumed in the titration may be calculated the quantity of formaldehyde which can be oxidized by this quantity of iodine, said quantity of formaldehyde in per cent by weight of the air-dry hairs expressing said formaldehyde value.

While the invention is susceptible to considerable variations and modifications in the manner of its particular application, particularly as regards the character of the reactants, the proportions of materials, the conditions of reaction and the exact method of procedure, the following examples and explanations will serve to illustrate how the invention may be practised:

*Example I*

The furs or skins are subjected to a washing process in the usual manner and while they are still in wet condition are subjected to chlorination. To this end, the skins are first steeped in a bath contained in a vat with stirring mechanism, said bath comprising 3 ccm. of sulphuric acid and 35 grams of sodium chloride per liter and having a temperature of about 20° C. After the skins are left in such bath for approximately five minutes 15 grams of chloride of lime (bleaching powder) and 30 ccm. of liquor containing chlorine per liter are added and in addition thereto 3 ccm. of albuminous matter or of a protein product or by-product as protective covering for the skin. It is to be noted that the liquor or bath rate will be about 1:15, i. e. 15 liter of bath liquid for each kilogram of skins. After approximately 45 minutes of such pre-treatment the skins are washed in water containing approximately 2 grams of sodium thiosulphate per liter whereby the last traces of chlorine are removed from the skins. This latter washing may be extended up to substantially 20 minutes and at a temperature of 30° C. Chlorine remaining particularly in the pores of the individual hair filaments after this washing process reacts with substances prevailing in the individual hairs whereby the effect is produced that the hairs will be impregnated and made water-repellent, but will further remain open for a better penetration of ingredients introduced during ensuing treatment stages.

Thereafter, the skins may be further treated, dressed, combed, etc. in any known manner.

In view of the above pre-treatment with chlorine, it is now possible to obtain surprisingly good effects on furs and the like upon contact with formaldehyde solution yielding less than about .7% concentration in the hair structure during an after-treatment which may take place during any stage of the treatment after the chlorination. Thus, formaldehyde traces remaining in the hairs will react with the previously halogenated hairs and wool of furs whereby under a following heat and pressure treatment a condensation product is obtained from said low concentrated formaldehyde in said hair filaments which imparts to the fur all the desirable properties heretofore effected on such furs treated with highly concentrated formaldehyde solutions.

Example II

The treatment of the furs or skins may also take place in a medium containing chlorine of relatively high concentration. The disadvantage resulting from such chlorination would be that the same would not be uniform and not evenly strong. In order to overcome such disadvantage formaldehydde is added directly to the medium of chlorine, whereby, on the one hand, the hairs or wool of the skins will be protected against the effect of higher concentrated chlorination, and, on the other hand, a uniform and gradual chlorination of the skins will be obtained since a relatively slow oxidation of the formaldehyde will occur which gradually develops carbonic acid:

$$2ClO' + HCHO \rightarrow 2Cl' + H_2CO_3$$

Example III

Instead of using a chlorine solution the skins can be treated in a chlorine gas atmosphere at 50 mm.; formaldehyde being also applied to the skins in gaseous form.

Example IV

Other halogens, such as bromine, may be used instead of chlorine or any organic or inorganic compounds which split off halogens.

Example V

Imperviousness of the skins to water may also be had by adequate pre-treatment of the skins by means of oxidizers, oxidizing agents, or oxygen developing acids, such as permanganate, chromic acids, etc. and their salts, such pre-treatment being, however, weaker than that employing chlorine or other halogens.

Example VI

Experience has shown that formaldehyde in monomer form has better effects than that in polymer form. Therefore, formaldehyde is preferably used in alkaline solution by the addition of triethanolamine rather than in a neutral or acid solution. Organic media, such as alcohol, acetone or the like can be added to alkaline formaldehyde to enhance the quality of the fibre. These organic media may be replaced by highly sulphonated Turkey-red oil (in acid state) or zinc chloride having a catalytic effect may be added to formaldehyde.

It is to be noted that in case of chlorination the same may occur before the dyeing process and the after-treatment can take place in any stage after the chlorination. In place of formaldehyde it is also possible to employ substances as for instance, bisulphite-aldehyde or acroleine (acryl-aldehyde), or other resinoid forming substances or any other known means producing imperviousness to water and reacting with the aforesaid media employed in the pre-treatment of the skins or furs. Formaldehyde may be replaced in some instances by poly-vinyl-methyl-ketone, poly-vinyl alcohol, etc.

It is well understood, that the concentration of formaldehyde, as mentioned herein above, must not necessarily be about .7% or less in the fibre or filamentous material, but can vary in accordance with the structure of such material and may be in some cases higher than 1%.

While I have, for the sake of clearness and of disclosing my invention, described specific ingredients and combinations thereof, it is to be understood that this invention is not necessarily limited to such specific ingredients and combinations, and it is desired to claim this invention so that changes as come within the scope of the appended claim are to be considered as part of this invention.

Having thus described my invention, what I claim and desire to secure by Letters Patent is:

In the method of permanently unkinking the hair or wool material on sheepskin; the steps of steeping said material into a bath containing a halogenating substance capable of impregnating the pores of and halogenating said hairs by causing a reaction between said halogenating substance and constituents contained within the hairs, then subjecting said material to resinoid forming means capable of leaving about .7 per cent concentration in the hairs and allowing said means to react with said previously halogenated hairs, further treating said hairs by straightening and combing the same, and finally ironing said hairs, thereby imparting heat and pressure thereto to produce with said relatively low concentrated resinoid forming means a condensation product in said hairs.

STEVEN S. GOTTFRIED.